United States Patent
Apfelbeck et al.

(10) Patent No.: US 7,594,742 B2
(45) Date of Patent: Sep. 29, 2009

(54) EXTERIOR MIRROR FOR A VEHICLE

(75) Inventors: Robert Apfelbeck, Plattling (DE); Alf Liesener, Schorndorf (DE); Klaus-Dieter Hezinger, Denkendorf (DE); Arne Schmierer, Kirchheim (DE)

(73) Assignee: Visiocorp Patents S.a.r.l., Luxembourg (LU)

( * ) Notice: Subject to any disclaimer, the term of this patent is extended or adjusted under 35 U.S.C. 154(b) by 0 days.

(21) Appl. No.: 11/752,767

(22) Filed: May 23, 2007

(65) Prior Publication Data

US 2008/0084703 A1   Apr. 10, 2008

(30) Foreign Application Priority Data

May 23, 2006   (DE) .................. 10 2006 025 070

(51) Int. Cl.
*B60Q 1/26* (2006.01)

(52) U.S. Cl. ...................... 362/494; 362/545

(58) Field of Classification Search ................ 362/135, 362/136, 137, 140, 492, 494, 545
See application file for complete search history.

(56) References Cited

U.S. PATENT DOCUMENTS

| | | | |
|---|---|---|---|
| 4,049,891 A | 9/1977 | Hong et al. | |
| 4,258,984 A | 3/1981 | Beni et al. | |
| 4,297,005 A | 10/1981 | Johnson, Jr. et al. | |
| 4,504,120 A | 3/1985 | von Alpen et al. | |
| 6,049,271 A * | 4/2000 | Chu | 340/463 |
| 6,139,171 A * | 10/2000 | Waldmann | 362/494 |
| 6,152,590 A * | 11/2000 | Furst et al. | 362/545 |
| 6,561,685 B2 * | 5/2003 | Weber et al. | 362/494 |
| 6,637,917 B2 * | 10/2003 | Schwanz et al. | 362/487 |
| 6,644,838 B2 * | 11/2003 | Stidham et al. | 362/494 |
| 6,769,798 B2 * | 8/2004 | Mishimagi | 362/522 |
| 6,918,685 B2 * | 7/2005 | Bukosky et al. | 362/301 |
| 6,932,497 B1 * | 8/2005 | Huang | 362/494 |
| 7,048,420 B2 | 5/2006 | Arakawa | |
| 7,342,707 B2 * | 3/2008 | Roberts et al. | 359/267 |
| 2004/0190303 A1 | 9/2004 | Mishimagi | |

FOREIGN PATENT DOCUMENTS

| | | |
|---|---|---|
| DE | 3016524 | 11/1981 |
| DE | 20008994 U | 8/2000 |
| DE | 200 08 994 U1 | 9/2000 |
| DE | 20011341 U | 9/2000 |
| DE | 200 11 341 U1 | 10/2000 |
| DE | 199 51 178 A1 | 12/2000 |
| DE | 19951178 | 12/2000 |
| DE | 102 51 380 | 5/2004 |
| GB | 1591234 | 6/1981 |

OTHER PUBLICATIONS

European Search Report, Mar. 11, 2008.

* cited by examiner

*Primary Examiner*—Hargobind S Sawhney
(74) *Attorney, Agent, or Firm*—Reising Ethington P.C.

(57) ABSTRACT

The invention relates to an exterior mirror of a vehicle with an opening facing rearward in assembled state, in a housing, with a cavity, into which a mirror can be received, and a forward facing rear wall, confining the cavity, with an exterior surface. At least two different light functions can be performed on the outer surface and/or the mirror, wherein the light functions comprise illuminants, which are grouped in one or several modules within the housing.

9 Claims, 2 Drawing Sheets

EXTERIOR MIRROR FOR A VEHICLE

BACKGROUND OF THE INVENTION

The invention is related to an exterior mirror of a vehicle according the German Patent application DE 102006025070.2 which is incorporated by reference.

Exterior mirrors, into which a light function is integrated, which is provided as a turning signal, are known. Therefore, a turning signal module is integrated into a forward wall of the mirror housing. Within the mirror housing, various components, as e.g. an actuator motor for tilting the mirror, for a respective heater, or for pivoting the exterior mirror into a parking position, are located.

It is the object of the invention to provide an exterior mirror for a vehicle, whose application area is expanded in spite of the limited installation space available.

SUMMARY OF THE INVENTION

The object is accomplished by an exterior mirror of a vehicle with an opening facing rearward in assembled state, in a housing with a cavity, into which a mirror can be received, and a forward wall confining the cavity with an exterior surface, where at least two different light functions can be performed on the exterior surface and/or on the mirror, wherein the light functions comprise illuminants, which are grouped into one or several modules within the housing.

Advantageous embodiments and advantages of the invention can be derived from the description.

The exterior mirror of a vehicle according to the invention has an opening, facing backward when mounted, in a housing with a cavity, into which a mirror can be received, as well as a forward wall with an exterior surface, confining the cavity. At least two different light functions can be incorporated into the exterior surface and/or the mirror, wherein the light functions comprise illuminants, which are grouped within the housing in one or several, in particular few, preferably a maximum of two modules. The integration of the light functions is performed via the module or the modules with various signal functions, which are installed into the outside mirror. Preferably, at least one light function, or signal function is associated with each module. It is thereby advantageous that also a plurality of illuminants can be used for establishing a light function, which can be arranged on the module in a very compact manner. Wiring can be very short, or can be integrated into the module, e.g. as conductive paths of a circuit board. A circuit board can then be used as a carrier of the illuminant(s), for mounting in the housing, and also for energy supply. By the same token, illuminants for various light functions can be provided in a common module. A common light control unit can be provided, which is integrated into the housing. A module preferably comprises one or several carriers for the illuminant(s), power supply means, mounting means for mounting into the housing, as well as electronics for controlling the illuminant(s). The illuminants can radiate light to the outside through corresponding openings in the housing, or they are inserted into the housing as an insert forming the module.

The module(s) are preferably disposed on the inside of the forward wall. In a particularly advantageous manner, the module is provided with electrical elements for activating the various light functions, which are distributed over few circuit boards in the cavity, e.g. over one or two circuit boards. A person skilled in the art will select a suitable number according to requirements. Thereby, an assembly is possible also in limited installation spaces.

The illuminants can be disposed in an insert forming a module, which is formed into the forward wall of the outer mirror. This allows an advantageous assembly of a lighting device for one or several light functions before assembling the exterior mirror, and thus facilitates the assembly of the exterior mirror. Furthermore, the insert can be provided very compact. A translucent light disc can be provided on the insert, so that it can easily be inserted into the outside mirror and a separate seal can be avoided. However, alternatively, a separate cover or similar can be provided.

Additionally or alternatively, at least one forward facing indentation can be provided in the forward wall, which has a pass-through for an illuminant, which faces outward from the cavity. Here the at least one indentation can be provided oval and/or an indentation can be provided round.

In an advantageous manner, the at least one indentation serves as a reflector of the illuminant. If LEDs (light emitting diodes) are being used as illuminants, the indentation can reflect the radiated light at least partially, so that a certain direction is given to the radiated light. If the light function is, for example, a day driving light, a preceding vehicle is better capable to detect the subsequent vehicle, which improves traffic safety.

The oval indentation can be disposed approximately horizontal, wherein the illuminant is located in an area of a rim close to the mirror, with the indentation extending away from the rim.

In an advantageous manner, the indentation can be provided deep enough, so that a lateral recognition of the light function is possible.

In a particularly advantageous manner, each illuminant can be provided with a seal, sealing to the outside. Thus a penetration of dust or humidity into the exterior mirror can be avoided.

The seal is preferably provided as a clear layer above the illuminants, e.g. cast over them as a coating.

The seal is advantageously placed as onto the housing as a cover. Thus the cover can extend over the entire forward wall, or the cover can be confined to an area with the one or several indentations and/or the insert.

Preferably the light functions are at least two from the group comprising signal light, day running light, side marking light (SML), parking light, position light (PO-light), boundary light, curb light, blind spot monitoring light (SWA). The blind spot monitoring light preferably backlights a display, which the driver can see in the mirror glass, while the other light functions are disposed preferably in the area of the forward wall, which cannot be seen directly by the driver, and whose lighting devices radiate light downward, forward, to the side and/or upward.

The illuminants can be advantageously provided so that different colors can be represented. Thus the blind spot monitoring light can shine in a color depending on the distance to an obstacle. This can be accomplished with means known to a person skilled in the art like e.g. filter elements or various color illuminants, which can be activated accordingly.

According to a further independent aspect of the invention, on an exterior mirror of a vehicle with an opening facing backwards in an assembled state, in a housing with a cavity, into which a mirror can be received, as well as a forward wall confining the cavity with an outer surface, at least two different light functions can be provided on the outer surface and/or on the mirror, wherein the light functions comprise illuminants, which are grouped in one or several modules within the housing, and wherein at least one backward facing indentation is provided in the forward wall, which has a pass-through for an illuminant, which faces outward from the cavity.

According to a further independent aspect of the invention, with an exterior mirror of a vehicle with an opening facing backwards in an assembled state, in a housing with a cavity, into which a mirror can be received, as well as a forward wall confining the cavity with an outer surface, at least two different light functions can be provided on the outer surface and/or on the mirror, wherein the light functions comprise illuminants, which are grouped in one or several modules within the housing, and wherein the illuminants are arranged in an insert forming a module, which is integrated into the forward wall.

Further advantages and details of the invention are subsequently explained in more detail, based on the preferred embodiments described in the drawing, without being confined to these embodiments.

BRIEF DESCRIPTION OF THE DRAWINGS

It is shown in.

DETAILED DESCRIPTION OF THE PREFERRED EMBODIMENT

Figure 1A:
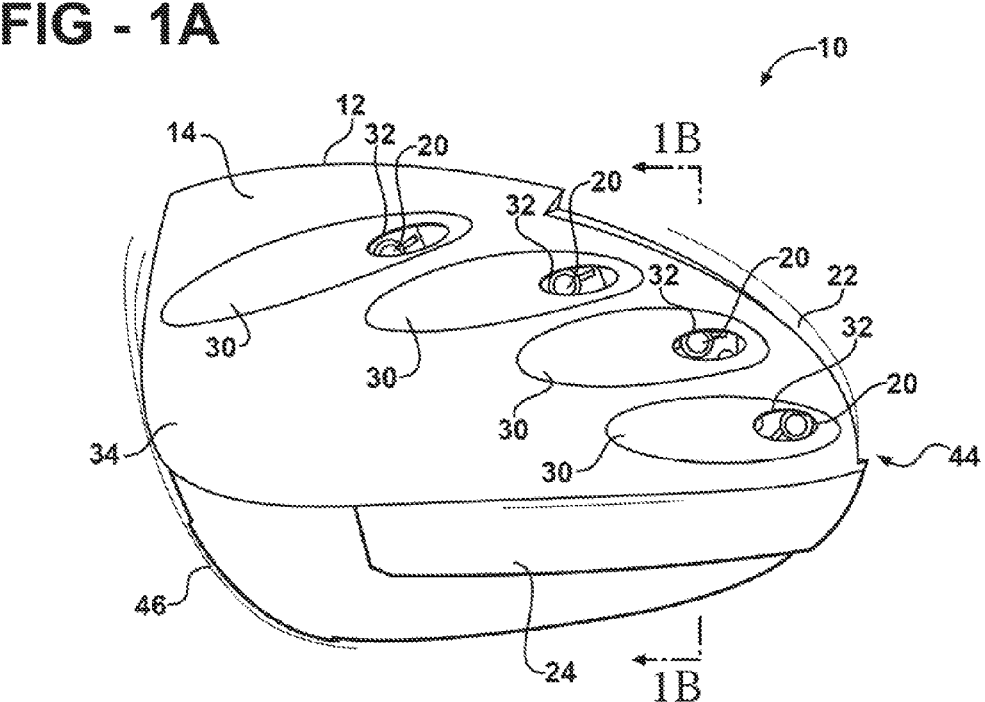
FIGS. 1a, b an exterior mirror according to a first preferred embodiment with indentation in a top view (a) and as a sectional view (b)

In the figures, elements with the same functions are designated with the same respective reference numerals.

Figure 1B:
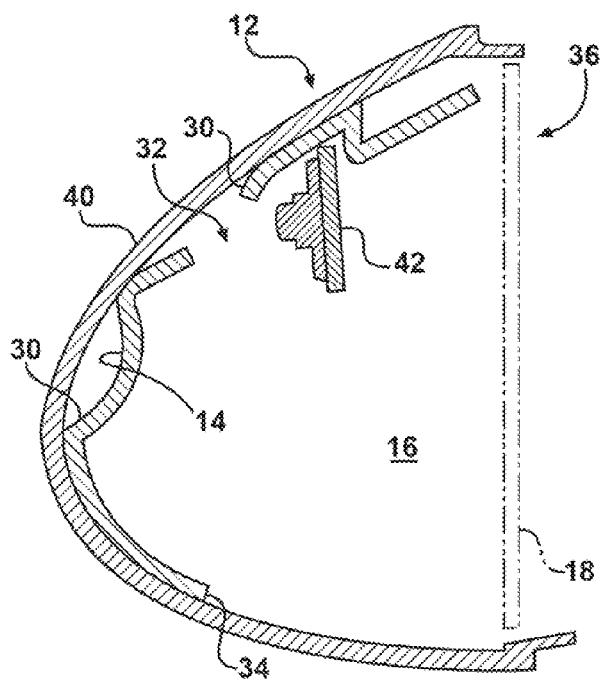

The FIGS. 1a and 1b illustrate a first preferred embodiment of an exterior mirror 10 of a vehicle according to the invention in a top view onto a forward wall 34 (FIG. 1a), and as a sectional view along the line b-b (FIG. 1b).

The exterior mirror 10 is mounted to the body of a vehicle with a vehicle side adapter 46, which is only symbolized in the figure. The exterior mirror 10 comprises a housing 12 with a cavity 16 and with an opening 36 facing rearward in assembled state, into which a mirror 18 is inserted. The cavity 16 is confined in forward direction through a bulging forward wall 34 with an exterior surface 14.

On the forward 34 several different light functions or signal functions are displayed, whose illuminants 20, 22, 24 are grouped in a schematically symbolized module 42, which is internally mounted to the forward wall 34.

In an exemplary manner, the illuminants 22 can be associated e.g. with a position light, and illuminants 24 with a downward radiating curb light, while the illuminants 20, which are preferably provided as LEDs, can be used as signal lights. The four illuminants 20 are inserted into four forward facing indentations 30 and protrude from the cavity 16 through one respective pass-through 32 in the forward wall 34 of the housing 12 towards the outside. The oval indentations 30 extend approximately horizontal, wherein the illuminants 20 are located in the area of the rim 44 of the housing 12, close to the mirror, and the indentation 30 extends away from the rim 44. The indentations 30 serve as a kind of reflector of the illuminant 20 and allow a recognition of the illuminants 20 from the front and from the side through an at least moderate directional effect upon the light.

The indentation 30 can preferably be provided deep enough, so that a lateral recognition of the light function is provided.

The illuminants 20, and also 22, and 24 are provided with a seal 40 sealing towards the outside, which is placed onto the forward wall 34 of the exterior mirror 10 as a transparent cover. The seal 40, which is provided as a cover also allows a downward light radiation. Through the flat and all covering configuration of the seal 40, the interior of the exterior mirror 10 is protected against contamination or against moisture penetration, and the seal 40 can be easily cleaned from the outside.

Figure 2A:
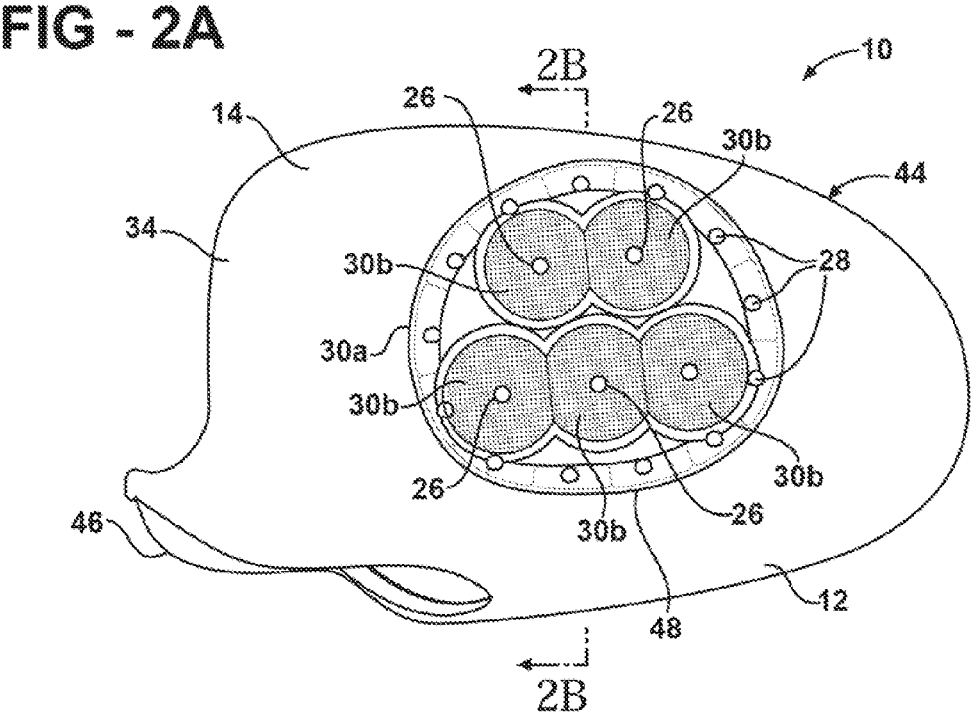
FIGS. 2a, b an outside mirror according to a second preferred embodiment with an insert with illuminants in a top view (a) and as a sectional view (b).
Figure 2B:
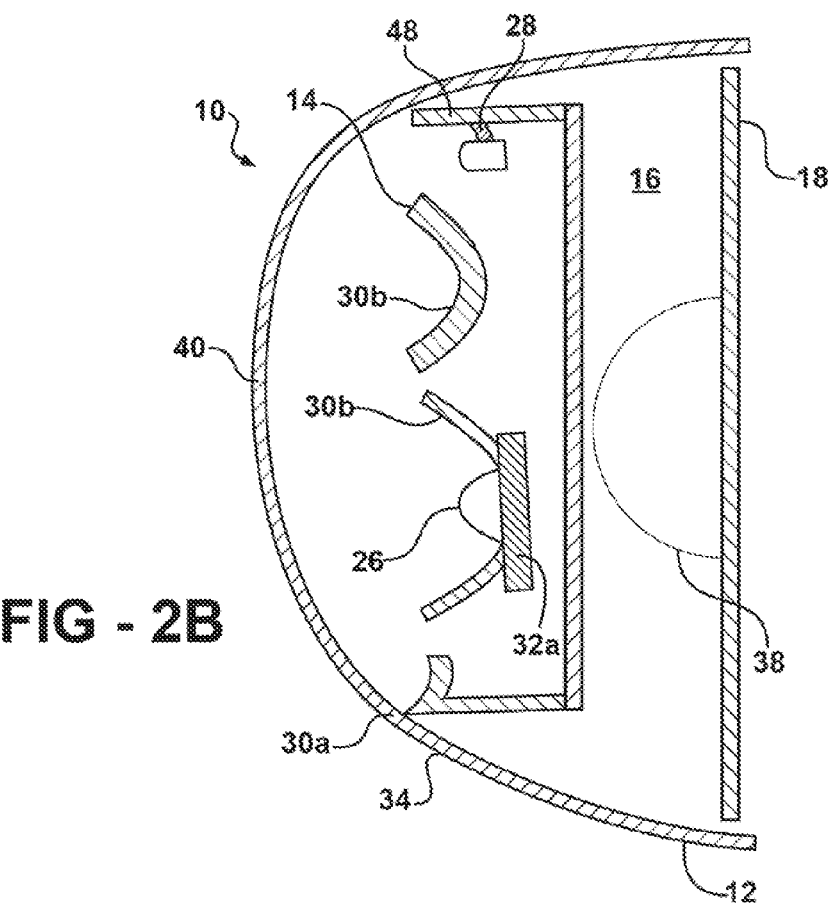

In FIGS. 2a and 2b, an alternative embodiment of a preferred exterior mirror 10 is shown, wherein FIG. 2a shows a top view and FIG. 2b shows a cut view along the line b-b. A combination of the two embodiments according to FIGS. 1a, b and FIGS. 2a, b is also possible.

The exterior mirror 10 is mounted to the body of a vehicle with a vehicle adapter 46, which is only symbolized in the figure. The exterior mirror 10 comprises a housing 12 with a cavity 16 and with an opening 36 facing backwards in the assembled state, into which a mirror 18 with an actuator motor 38 for tilting the mirror 18 is inserted. The cavity 16 is confined in forward direction through a forward bulging forward wall 34 with an exterior surface 14.

On the forward wall 34 several different light functions or signal functions are depicted, whose illuminants 26, 28 are grouped in a module 48, which is integrated into the forward wall 34. Therefore, the forward wall 34 has an opening 30a.

The five illuminants 26 protrude into the openings 32a within forward opened reflectors 30b, and they are surrounded with a ring shaped plurality of illuminants 28, out of which only a few are designated for reasons of clarity. The illuminants 28 also sit in small reflectors that are not designated in more detail. The illuminants 26 and 28 preferably radiate light in various colors.

The module 48, which is provided as an insert is covered with a seal 40, provided as a transparent cover, and protected against the penetration of dirt and humidity. The seal 40 can be a component of the module 48, or a respective cover over the entire forward wall 34 can be provided like in the first embodiment.

The invention claimed is:

1. An exterior mirror assembly comprising:
a housing defining an opening rearward;
a mirror operatively secured to said housing and visible through said opening;
a forward wall having a bulging forward contour;
a plurality of pass through openings extending through said forward wall;
a plurality of illuminators for emitting light forward of said forward wall, each of said plurality of illuminators disposed adjacent each of said plurality of pass through openings; and
a plurality of indentations disrupting said bulging forward contour of said forward wall, wherein each of said plurality of indentations is disposed adjacent each of said plurality of pass through holes wherein one of said plurality of indentations includes reflective surface for reflecting light emitted by one of said plurality of illuminators.

2. An exterior mirror assembly as set forth in claim 1 including a light control unit electrically connected to each of said plurality of illuminators for independently controlling each of said plurality of illuminators such that said control assembly illuminates each of said plurality of illuminators independently of each other.

3. An exterior mirror assembly as set forth in claim 2 including a seal that seals said plurality of illuminators and said plurality of indentations from the elements.

4. An exterior mirror assembly as set forth in claim 3 wherein said seal seals all of said forward wall.

5. An exterior mirror assembly as set forth in claim 4 wherein each of said plurality of indentations define spaces independent of each other.

6. An exterior mirror assembly as set forth in claim 5 wherein each of said plurality of indentations surrounds each of said plurality of pass through holes.

7. An exterior mirror assembly as set forth in claim 6 wherein a portion of said plurality of indentations extend horizontally across a portion of said forward wall.

8. An exterior mirror assembly as set forth in claim 7 wherein said plurality of illuminators are at least two out of a group consisting of: a signal light, a day running light, a side marking light, a parking light, a position light, a boundary light, a curb light and a blind angle monitoring light.

9. An exterior mirror assembly as set forth in claim 8 wherein each of said plurality of illuminators emits a different color light.

* * * * *